United States Patent
Illingworth

(10) Patent No.: US 6,612,402 B1
(45) Date of Patent: Sep. 2, 2003

(54) ELASTIC MOTOR WITH CONSTANT TORQUE OUTPUT

(75) Inventor: Lewis Illingworth, Kensington, NH (US)

(73) Assignee: Avionic Instruments, Inc., Avenel, NJ (US)

( * ) Notice: Subject to any disclaimer, the term of this patent is extended or adjusted under 35 U.S.C. 154(b) by 0 days.

(21) Appl. No.: 09/578,419

(22) Filed: May 25, 2000

(51) Int. Cl.[7] .............................. F03G 1/00; B65H 75/48
(52) U.S. Cl. ..................... 185/39; 185/DIG. 1; 242/373
(58) Field of Search .................. 185/DIG. 1, 40 R, 185/39, 10, 11; 446/232, 260, 261; 242/373

(56) References Cited

U.S. PATENT DOCUMENTS

| | | | | |
|---|---|---|---|---|
| 229,887 A | * | 7/1880 | Horton | 185/39 X |
| 281,571 A | * | 7/1883 | Silver | 185/39 |
| 1,427,790 A | * | 9/1922 | Earley | 185/DIG. 1 |
| 1,731,047 A | * | 10/1929 | Holtzman | 446/232 |
| 3,491,602 A | * | 1/1970 | New | 185/40 R X |
| 3,698,516 A | * | 10/1972 | Williams | 285/35 X |
| 3,893,592 A | * | 7/1975 | Friedman | 185/39 |
| 5,235,170 A | * | 8/1993 | Attilio | 235/475 |
| 5,334,070 A | * | 8/1994 | Yu et al. | 446/232 X |
| 5,957,797 A | * | 9/1999 | Hong | 474/148 |
| 6,279,895 B1 | * | 8/2001 | Tranquilla | 271/35 |

FOREIGN PATENT DOCUMENTS

EP 585066 * 3/1994 ............... 185/39

* cited by examiner

Primary Examiner—Charles A. Marmor
Assistant Examiner—Roger Pang
(74) Attorney, Agent, or Firm—Ward & Olive

(57) ABSTRACT

An improved elastic motor is disclosed having a constant torque characteristic. In contrast to earlier motors which use springs wound on spools, the present invention utilizes a reel with elastic stretched to its maximum tension. Each unit length of the elastic is allowed to relax back to its normal state while generating work in a process that will continue until the wheel is fully unwound. The present invention will ease the design of mobile devices and the like by providing a power source having a predictable, stable, and constant torque output characteristic.

8 Claims, 5 Drawing Sheets

ELASTIC MOTOR WITH CONSTANT TORQUE OUTPUT

SCOPE OF THE INVENTION

This invention relates generally to elastic motors, and more specifically, to an improved elastic motor having constant torque characteristics.

BACKGROUND OF THE INVENTION

Elastic motors have been employed for centuries and have found particular application in model airplanes for over 150 years.

Typical prior art elastic motors, such as those used in a model airplane, generally comprise a rubber loop threaded through a hook on a propeller shaft and is further attached to another hook at the tail of the craft. As the motor is wound up it first twists the elastic into a skein, then a row of knots form and spread along the whole length. A third stage occurs when a row of knots forms in the already knotted skein. When this row is complete the rubber is substantially stretched to its limit.

Upon release of propeller, there is a burst of power. When this is spent, a period of slowly declining torque follows for the majority of the motor run and is followed by a decline to zero torque.

The torque characteristics of the prior art elastic motor devices, like those described above, make model airplane design a considerable challenge. Clearly, this is because it is difficult for a designer to properly construct design constraints when the source of propulsion has such wavering torque characteristics. Aside from model airplane design, conventional elastic motors have undesirable performance in other applications as well. The knotting of the rubber introduces internal friction in the wound skein that can be eased somewhat by lubrication. Lubrication, however, drastically reduces the useful life of the rubber.

Therefore, the shortcomings of the prior art suggest a strong need for an elastic motor design that has a constant torque characteristic and does not damage the elastic material.

SUMMARY OF THE INVENTION

The present invention is directed towards an elastic motor, more specifically, to an elastic motor having a constant torque characteristic.

The motor system of an embodiment of the present invention starts with a reel which is wound with elastic stretched to its maximum tension. Each unit length of the elastic is allowed to relax back to its normal state while generating torque in a process that continues until the reel is fully unwound. The process may be seen as analogous to a steam engine which has a supply of steam at constant pressure. Portions of steam are fed to a cylinder where they expand to generate work (pressure times change in volume) by pushing a cylinder back to turn a wheel. When the expansion is complete the steam is exhausted and the process repeated. In the case of the present invention, a unit length of stretched elastic is connected into a system and allowed to contract to its unstressed state while turning a wheel and developing work. When fully contracted the relaxed elastic is fed to a take up reel and a new unit length of stretched elastic is taken. The process is continued until all the stretched elastic is used up. There is no twisting or knotting of the elastic and no need to lubricate it to prevent binding and wear as in a twisted skein, although some lubrication may assist operation.

Hence, it is an object of the invention to provide an improved elastic motor.

Furthermore, it is an object of the invention to provide an improved elastic motor having a constant torque characteristic.

Further, it is an object of the invention to provide an improved means of powering portable devices.

Additionally, it is an object of the invention to provide an elastic motor having increased elastic material life.

Further, it is an object of the invention to provide an improved means of driving a dynamo.

Furthermore, it is an object of the invention to provide an improved means of powering wind-up toys and devices.

These and other objects will become apparent to those skilled in the art upon study of the following drawings and detailed description.

DETAILED DESCRIPTION OF THE INVENTION

Figure 1:
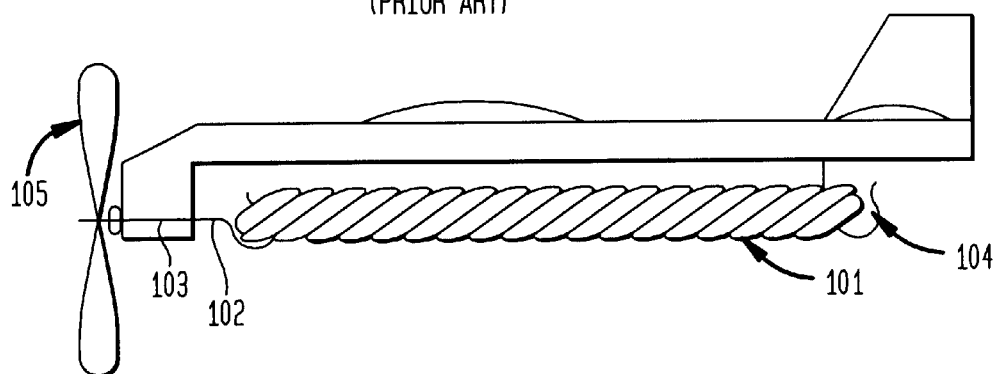
FIG. 1 (FIG. 1) depicts an elastic motor typical of the prior art.

FIG. 1 depicts a typical prior art elastic motor in a model airplane. A rubber loop 101 is threaded through a hook 102 on the propeller shaft 103 and is attached to another hook 104 at the tail. As the motor is wound up it first twists into a skein, then a row of knots form and spread along the whole length. A third stage occurs when a row of knots forms in the already knotted skein. When this row is complete the rubber is generally stretched to its limit.

Figure 2:
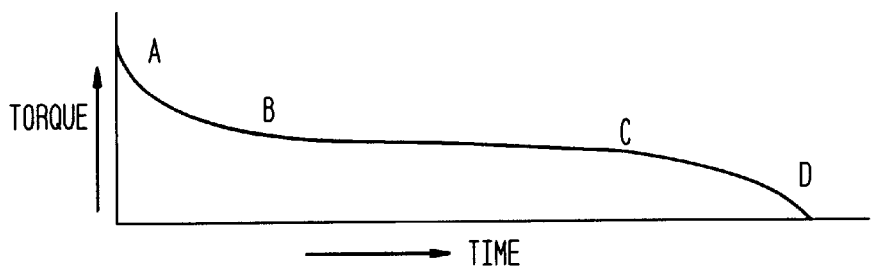
FIG. 2 (FIG. 2) depicts the torque characteristics of an elastic motor typical of the prior art.

Upon release of propeller 105 there is a burst of power, A to B as depicted on the torque characteristic of FIG. 2. When this is spent, a period of slowly declining torque B to C follows for the majority of the motor run and is followed by a decline to zero torque, points C to D.

Figure 3A:
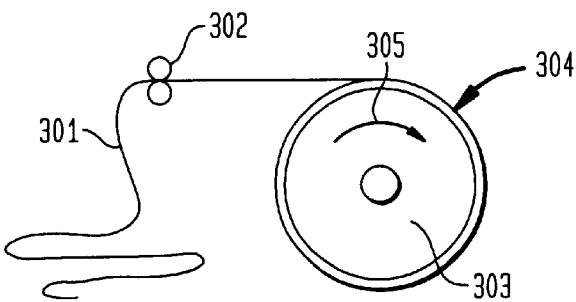
FIG. 3A (FIG. 3A) depicts an elastic motor, in accordance with the present invention, in wind up mode.

FIGS. 3A through 3D show a first embodiment of the present invention. FIG. 3A shows an elastic motor in accordance with the present invention in wind up mode. Fully relaxed elastic 301 passes through movable rollers 302 as reel 303 rotates in a clockwise direction 305. The elastic 304 is wound at constant tension and is fully stretched.

Figure 3B:
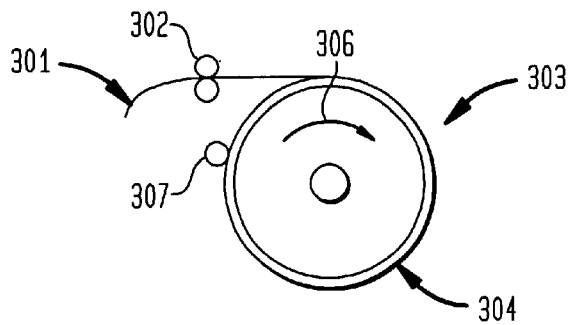
FIG. 3B (FIG. 3B) depicts an elastic motor, in accordance with the present invention, in the start of operating mode.

In FIG. 3B, an elastic motor in accordance with the present invention at the start of operating mode is depicted. Movable rollers 302 grab the elastic 301 close to the reel 303. Bar 307 is coupled to the reel 303 and is used to prevent slip of the stretched elastic 304. The length of the elastic between 307 and 302 is NL where L is a unit length of relaxed elastic. The operation cycle allows this to be relaxed back to its relaxed length L while the tension in the elastic provides torque to turn reel 303 and supply power to a load. Reel 303, upon release, will begin to rotate in a counterclockwise direction 306.

Figure 3C:
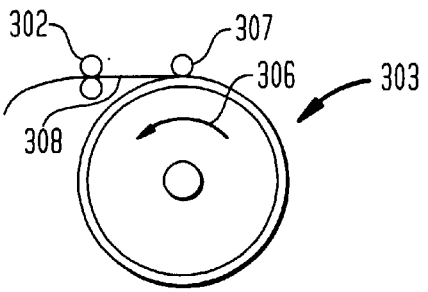
FIG. 3C (FIG. 3C) depicts an elastic motor, in accordance with the present invention, at the end of the first cycle of operation.

FIG. 3C depicts an elastic motor in accordance with the present invention at the end of the first operating cycle. Reel 303 is allowed to release, causing counterclockwise rotation 306. The length between rollers 302 and bar 307 shortens to unit length L as the tension in the elastic 308 decreases until complete relaxation.

Figure 3D:
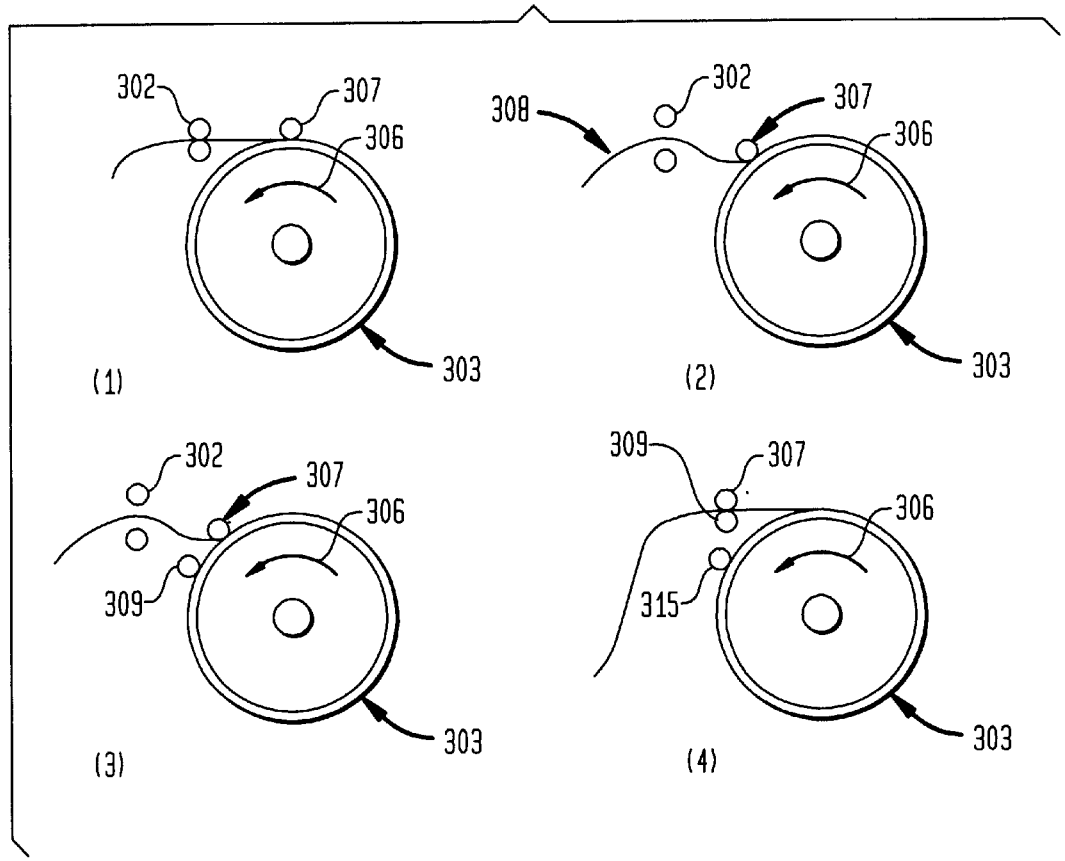
FIG. 3D (FIG. 3D) depicts the behavior of the elastic material in an elastic motor in accordance with the present invention.

FIG. 3D depicts an elastic motor in accordance with the present invention that is capable of multiple operating cycles. This is accomplished by introducing an additional bar 309 and disengaging bar 307. In FIG. 3D(1), the elastic motor is shown at the end of the first operating cycle, as described above in FIG. 3C. In FIG. 3D(2), rollers 302 are first backed up and the elastic 308 is released. Bar 307 remains engaged to maintain secure contact between elastic 308 and reel 303. Reel 303 continues to rotate in counterclockwise direction 306. In FIG. 3D(3) the changeover point between cycles is shown. While the elastic remains released between reels 302, additional bar 309 is introduced between bar 307 and elastic 308. Reel 303 is poised to continue rotation in counterclockwise direction 306. In FIG. 3D(4) the start of the second cycle is shown. Pinch rollers 307 and 309 are moved to position 302 and new clamping bar 315 is placed in the initial position of 307 as in FIG. 3B. Clamping rollers 307 and 309 are opened and elastic 308 is released. This cycle is identical to the start of the first operating cycle described in FIG. 3B, with bar 307 replaced with bar 315. Reel 303 is now ready to continue rotating in counterclockwise direction 306 until bar 315 approaches clamping rollers 307 and 309 in position 302. At that point, the cycle repeats with bar 315 in position of 307 of FIG. 3D(1). The pinch rollers 302 and clamping bars 307, 315 and 309 recycle their functions with each ensuing cycle.

Figure 3E:
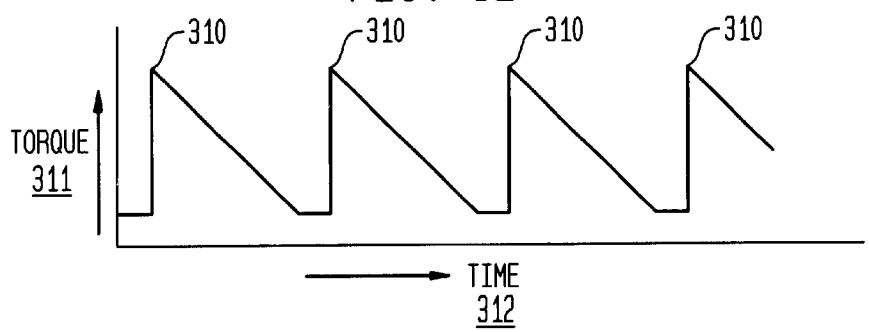
FIG. 3E (FIG. 3E) depicts the torque characteristics of an elastic motor in accordance with the present invention.

FIG. 3E depicts the output torque characteristics of the elastic motor just described. Torque is plotted on axis 311 versus time on axis 312. Peak values 310 are equal to the elastic tension multiplied by the reel radius. The average output torque is half that amount and is constant throughout operation.

Figure 3F:
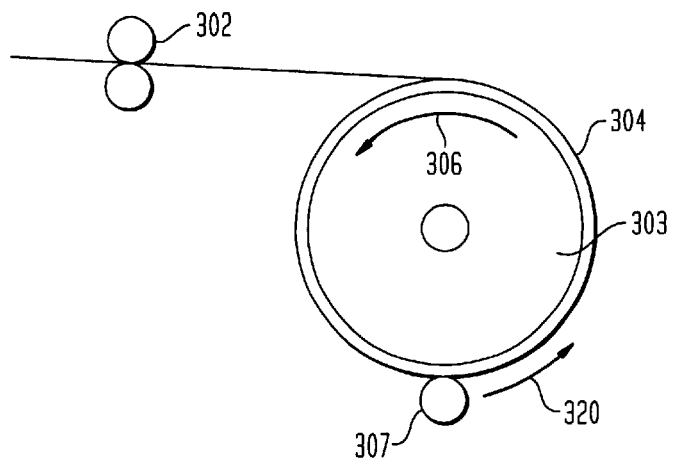
FIG. 3F (FIG. 3F) depicts an intermediate position of the bar when traveling around the periphery of the reel during the operational mode.

FIG. 3F depicts reel 303 in an intermediate position between those shown in FIGS. 3B and 3C. Here, reel 303 is rotating in counterclockwise direction 306 while stretched elastic 304 is released. Bar 307 moves along the periphery of reel 303 as shown by arrow 320. Thus, bar member 307 begins on the upper left-hand side of reel 303 (FIG. 3B) and finishes at the top of reel 303 (FIG. 3C) during the operational mode.

Figure 4A:
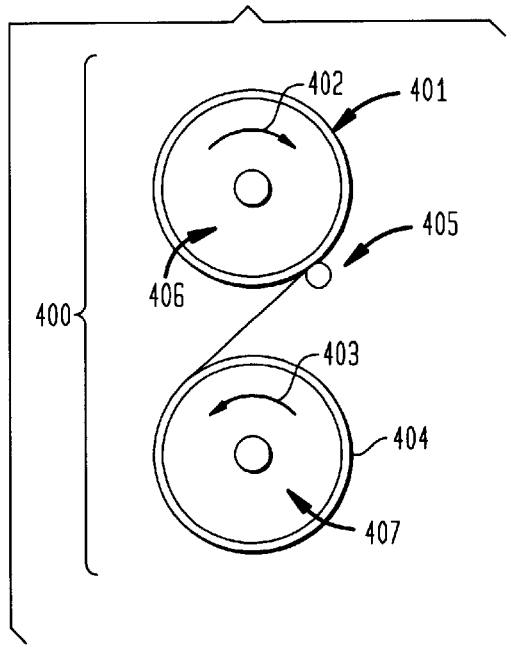
FIG. 4A (FIG. 4A) depicts an alternate embodiment of an elastic motor in accordance with the present invention.

Another embodiment of the present invention comprises two reels, one for relaxed elastic, the other for stretched elastic. The two reels may be the size, but it is not necessary. Differing diameters or geometries can provide different output characteristics. FIG. 4A depicts an exemplary motor 400 in accordance with this embodiment of the present invention. Motor 400 is shown in wind up mode. Reel 406 is loaded with relaxed rubber 401, the end of which is connected to opposing reel 407. Reel 406 rotates in a clockwise direction 403 and reel 407 rotates in counterclockwise direction 403. The elastic 404 wound on reel 407 is stretched to n times its lengthened, and optimally, is at full tension. Thus reel 407 turns n times as fast as reel 406. Roller 405 prevents the elastic 401 on reel 406 from slipping over itself and ruining the tension relationship.

Figure 4B:
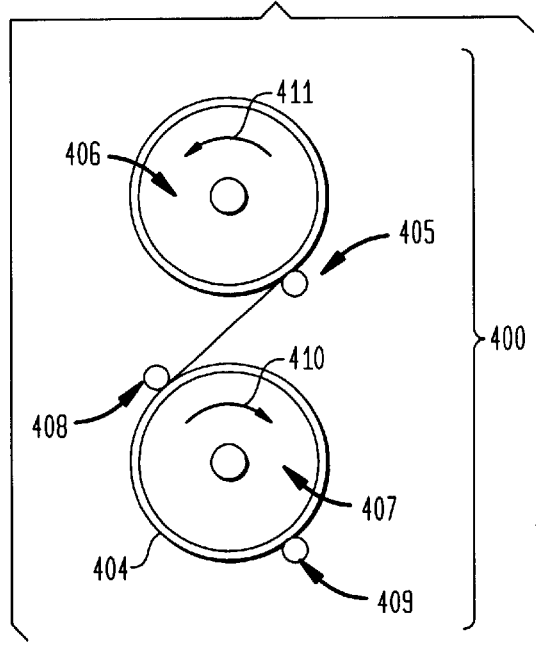
FIG. 4B (FIG. 4B) depicts an alternate embodiment of an elastic motor in accordance with the present invention, in operational mode.

FIG. 4B depicts the motor 400 in operational mode, wherein the device is producing work. Reel 407 has two bars 408 and 409 pressing against the elastic 404 to prevent slippage. Reel 407 rotates in clockwise direction 410 taking bars 408 and 409 with it. Opposing reel 406 rotates in counterclockwise direction 411. When bar 408 approaches roller 405, the elastic 404 between bar 408 and roller 405 is in its relaxed state. At this point, roller 405 is disengaged to allow bar 408 to pass and further allow elastic 404 to wind onto reel 406. After bar 408 passes, roller 405 is put back in place. Bar 408 is now removed and the elastic 404 between bar 407 and roller 405 undergoes the same process. At this point, bar 408 is replaced and is ready for the next cycle. Motor 400 is capable of multiple operating cycles.

Figure 5A:
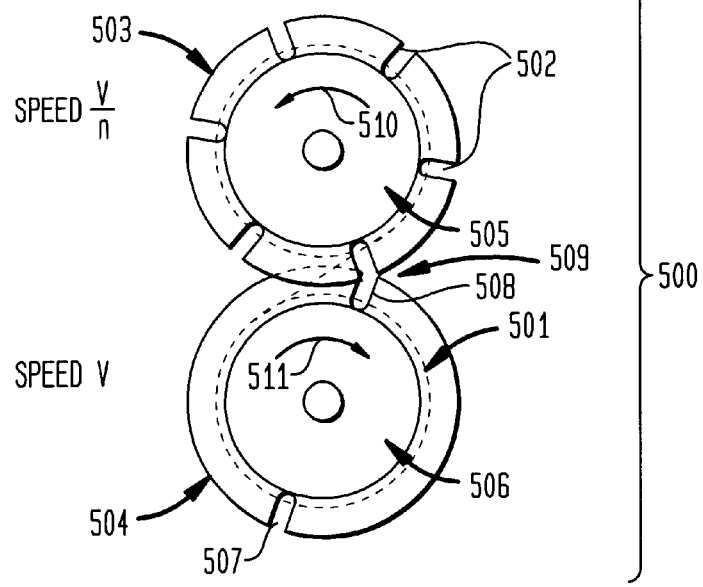
FIG. 5A (FIG. 5A) depicts an alternate embodiment of an elastic motor in accordance with the present invention utilizing crossbars in the elastic.

Such a device 400 as described can achieve the required operation, however, the need to remove and replace bars 408 and 409 and roller 405 complicates operation. Thus, an alternate embodiment is depicted in FIG. 5A. An elastic sheet 501 is used comprising integral crossbars that engage in slots 502, 507 and 508 on reel end plates 503 and 504 to maintain the high and low tension zones in the elastic 501 and allow automatic transfer between the two reels 505 and 506 without the need for any other moving parts. The two reels 505 and 506 are fitted with slotted end plates 503 and 504. Reel 505 rotates in counterclockwise direction 510 n times as fast as reel 506 rotates in clockwise direction 511. Reel 506 has two slots 507 and 508 in its end plates. Reel 505 has 2n slots 502 in its end plates 503. The end plates 503 and 504 overlap at point 509 so that the elastic 501 can transfer between the reels 505 and 506 without any slipping and thus maintain the tension relationship. Rotating reel 506 counterclockwise will automatically stretch the elastic 501 to n times its original length. The two reels 505 and 506 could be coupled together by a gear box or a cog belt to have an n to 1 speed ratio and assist in maintaining accurate alignment. Coupling the two reels 505 and 506 together reduces the output torque to $[1-(1-/n)]$ of the maximum. Thus, the higher the value of n, the higher the system efficiency.

Figure 5B:
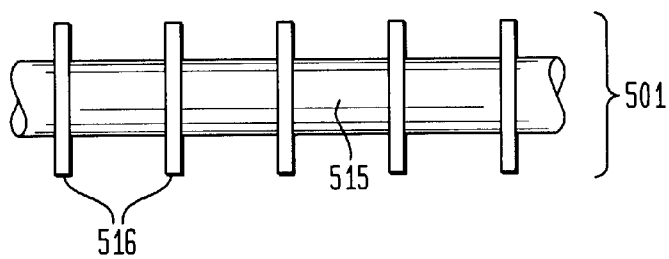
FIG. 5B (FIG. 5B) depicts a detail of the elastic used in the device of FIG. 5A.

FIG. 5B depicts a detail of the elastic used in device 500. Elastic 501 comprises an elastic strip 515 and integral crossbars 516. Crossbars 516 articulate with slots 502, 507 and 508 to constrain the movement of reels 505 and 506 and thus maintain the tension relationship.

Figure 6:
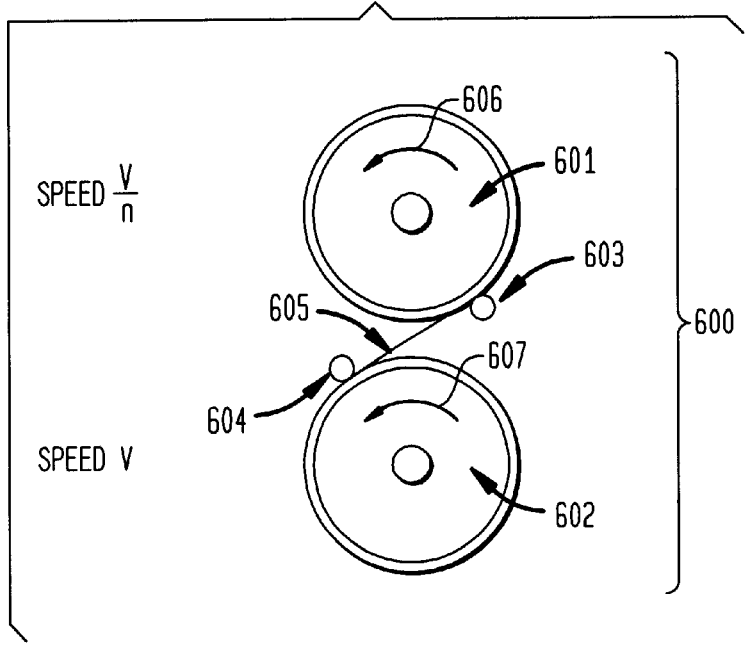
FIG. 6 (FIG. 6) depicts a simplified two reel arrangement utilizing two rollers.

FIG. 6 depicts a simplified two reel system 600 utilizing two rollers 603 and 604. Relaxed tension reel 601 rotates in counterclockwise direction 606 at 1/n times the speed the stretched elastic reel 602 rotates in clockwise direction 607. Two rollers 603 and 604 prevent the elastic 605 from slipping on reels 601 and 602. The system 600 winds up on reel 602 and the elastic 605 is stretched n times its released length. However, one who is skilled in the art would recognize the need to maintain high tension between rollers 604 and 603 to maintain motive force.

Figure 7:
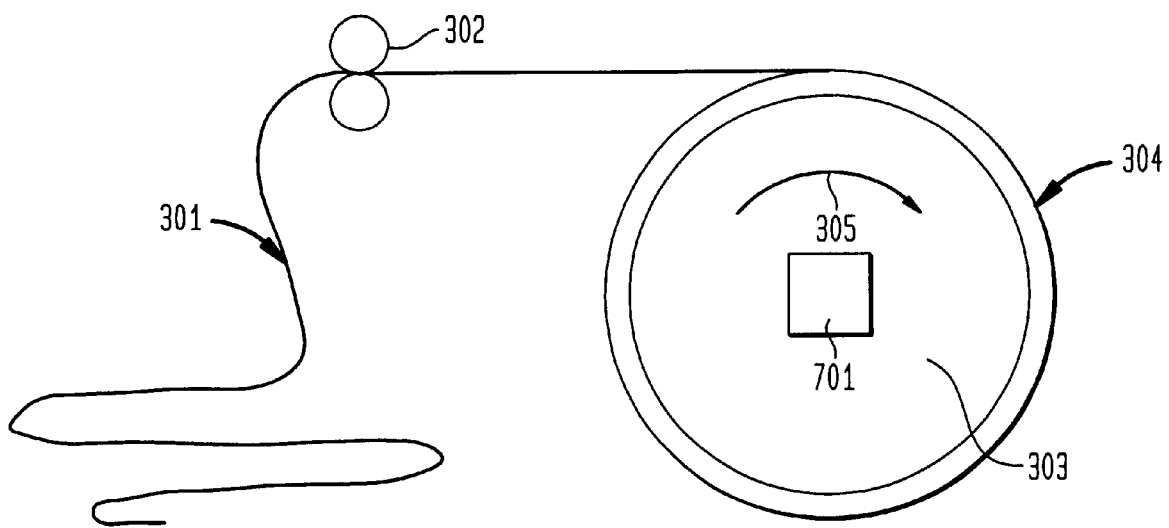
FIG. 7 (FIG. 7) depicts an elastic motor, in accordance with the present invention, being wound by a motor in wind up mode.

FIG. 7 depicts an additional embodiment of the elastic motor in wind up mode. Here, motor 701 is utilized to provide power to rotate reel 303 in direction 305. Fully relaxed elastic 301 is then wound around reel 303. As in earlier embodiments, tension rollers 302 stretch elastic 304 such that it wound around reel 303 under tension. Various other means may be implemented in place of motor 701. Additionally, reel 303 may be manually wound.

Figure 8:
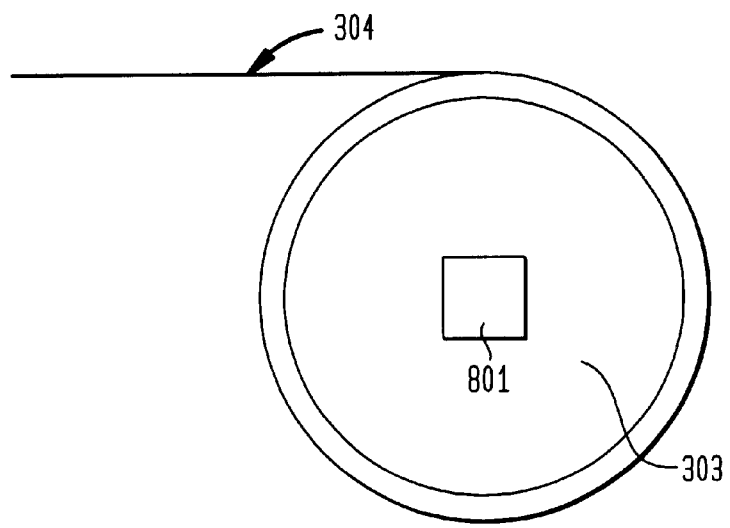
FIG. 8 (FIG. 8) depicts an elastic motor, in accordance with the present invention, comprising a lock.

FIG. 8 depicts an additional embodiment of the elastic motor comprising lock 801. Lock 801 is utilized to lock the rotation of reel 303 so that stretched elastic 304 may be stored on reel 304. Furthermore, lock 801 may be used to stop the elastic motor while operating.

I claim:

1. A mechanical stored energy device comprising:

a rotatable reel, said rotatable reel further comprising a lock to prevent rotation of said rotatable reel;

a member, said member being both flexible and stretchable, said member capable of winding upon said rotatable reel under tension, wherein said tension stretches said member;

movable rollers for guiding the travel of said member;

bar means capable of pressing against said member to prevent slipping of said member during travel of said member around said rotatable reel, wherein said bar means is capable of traveling along the periphery of said reel;

wherein upon release of said lock, said rotatable reel is allowed to rotate, thereby releasing the energy stored in said member under tension with a constant torque characteristic.

2. A mechanical stored energy device comprising:

a rotatable reel, said rotatable reel further comprising a lock to prevent rotation of said rotatable reel;

a member, said member being both flexible and stretchable, said member capable of winding upon said rotatable reel under tension, wherein said tension stretches said member;

movable rollers for guiding the travel of said member;

bar means capable of pressing against said member to prevent slipping of said member during travel of said member around said rotatable reel, wherein said bar means is capable of traveling along the periphery of said reel, said bar traveling circularly in the direction of the rotation of said reel;

wherein upon release of said lock, said rotatable reel is allowed to rotate, thereby releasing the energy stored in said member under tension with a constant torque characteristic.

3. A mechanical stored energy device comprising:

a rotatable reel, said rotatable reel further comprising a lock to prevent rotation of said rotatable reel;

a member, said member being both flexible and stretchable, said member capable of winding upon said rotatable reel under tension, wherein said tension stretches said member;

movable rollers for guiding the travel of said member;

bar means capable of pressing against said member to prevent slipping of said member during travel of said member around said rotatable reel;

wherein said movable rollers compress said member as said member winds upon said rotatable reel, thus imparting tension to said member, and further wherein upon release of said lock, said rotatable reel is allowed to rotate, thereby releasing the energy stored in said member under tension with a constant torque characteristic.

4. A mechanical stored energy device in accordance with claim 3, further comprising a motor wherein said motor rotates said rotatable reel, thereby bringing said member into tension.

5. A mechanical stored energy device in accordance with claim 3, wherein said member is an elastomeric material.

6. A mechanical stored energy device in accordance with claim 3, wherein said rotatable reel is cylindrically shaped.

7. A mechanical stored energy device in accordance with claim 3 wherein said bar means is capable of traveling along the periphery of said reel.

8. A mechanical stored energy device in accordance with claim 3 wherein said bar means is capable of traveling along the periphery of said reel, said bar traveling circularly in the direction of the rotation of said reel.

* * * * *